Nov. 4, 1952  F. C. SCHWANEKE  2,616,732
RELEASE MECHANISM FOR COUPLED SPINDLES AND SHAFTS
Filed Nov. 7, 1950  2 SHEETS—SHEET 1
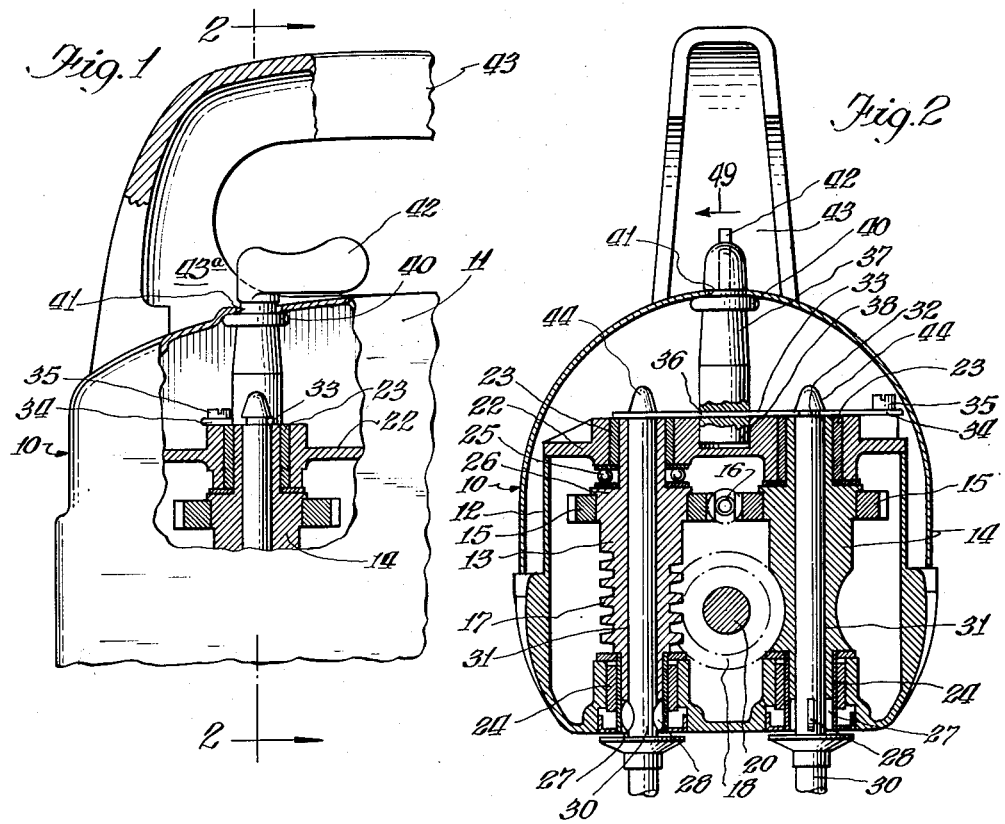
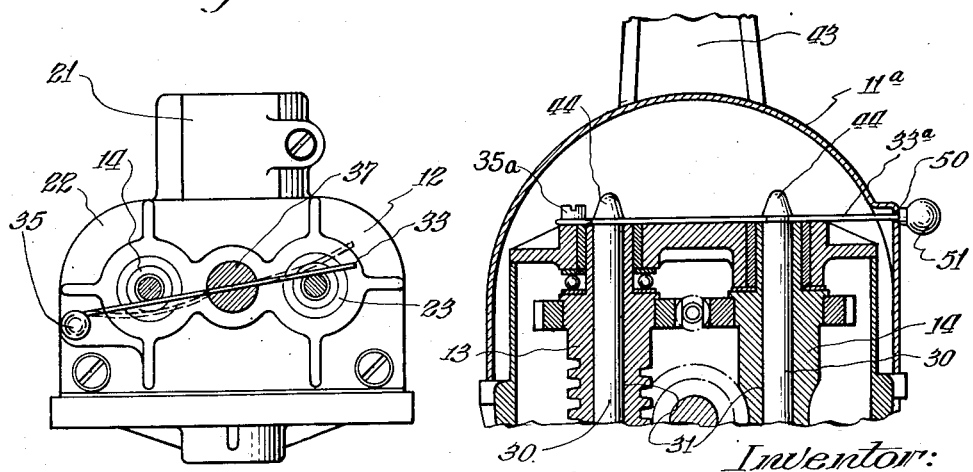
Inventor:
Fred C. Schwaneke
By: Harbaugh and Hinrichs
attys.

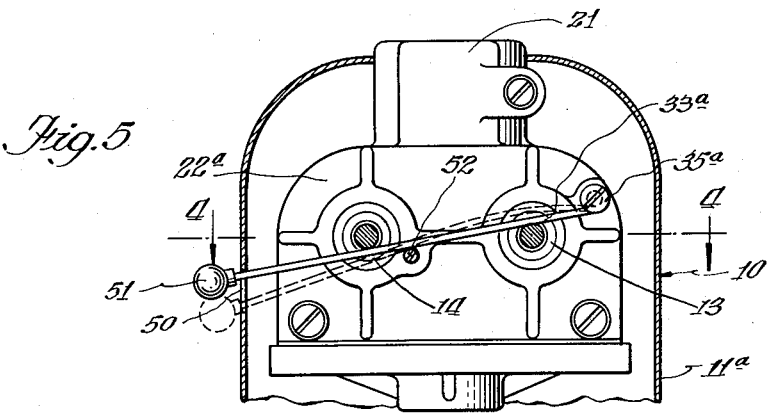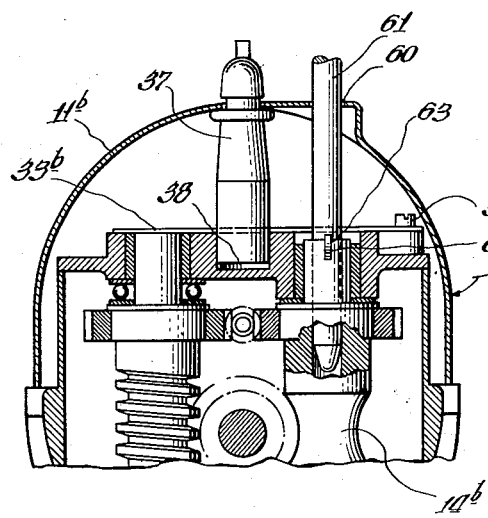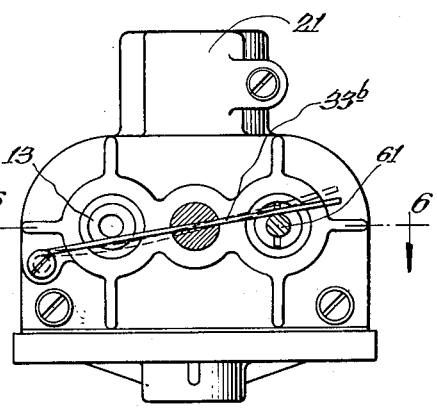

Patented Nov. 4, 1952

2,616,732

UNITED STATES PATENT OFFICE 2,616,732

RELEASE MECHANISM FOR COUPLED SPINDLES AND SHAFTS

Fred C. Schwaneke, Chicago, Ill., assignor to Dormeyer Corporation, Chicago, Ill., a corporation of Illinois Application November 7, 1950, Serial No. 194,499

10 Claims. (Cl. 287—20)

This invention relates generally to household food mixers and more particularly to an improved beater release mechanism for disconnecting mixing tools from the mixer power unit.

Household food mixers usually comprise a stand or base, a mixing bowl adapted to be supported on one end of the base, and an electric motor power unit supported on the opposite end of the base so as to overhang the bowl. The mixing beaters, usually two in number, are carried by the power unit and extend downwardly into the bowl, their lower ends being so shaped as to agitate or stir the mix when they rotate. In most household food mixers the beater shafts are parallel and are spaced a predetermined distance apart, the lower ends of the beaters having spaced blades which interdigitate as the beaters are rotated in opposite directions. The shafts of the beaters are usually received in rotary drive spindles journalled in the power unit and driven by the electric motor through appropriate gears. In most mixers the beaters are readily removable from the spindles so that they may be taken out and cleaned after use. A commonly used arrangement is to provide a key on each beater, which effects a drive relationship with the spindle, and a resilient element, which engages an undercut or groove to hold the beater in the spindle with the key engaged. The resilient element may be attached either to the beater or the spindle.

Such arrangements, however, have the disadvantage that the beaters must be separately withdrawn by hand on completion of the mixing unless a beater ejector mechanism for simultaneously forcing the beaters out of the spindles is provided. Such an ejector is fully disclosed and claimed in Patent No. 2,515,755 for Beater Ejector granted July 18, 1950 to Walter W. Krause, reference to which is hereby made.

One important object of this invention is to provide a simple mechanism for holding a plurality of beaters in drive relationship with their drive spindles, the mechanism being adapted to effect release of all of the beaters simultaneously, allowing them to fall out of the spindles when a lever or knob is actuated.

Another object is to provide a beater release mechanism which will retain one or more beaters of a plurality in drive engagement in the spindles and which operates automatically on insertion of the beaters to retain each beater as it is inserted, the beaters being loosely received in the spindles so as to fall out under the influence of gravity when the release mechanism is actuated.

Another object is to provide a beater release mechanism for a mixer having a power take-off socket in the top thereof, the release being adapted to permit the ready insertion of a tool shaft into the upper end of one of the beater spindles and to prevent the locking of a beater in the other beater spindle when the tool shaft is installed in the former.

A further object is to provide a beater release mechanism conveniently located near the top of the mixer so as to be free of contamination by the materials being mixed, the release being capable of one-finger operation.

Further objects and advantages will of course present themselves to those reading the following specification in conjunction with the drawings and the appended claims.

In the drawings:

Fig. 1 is a side view, partially in section, of a portion of a food mixer power unit having a preferred embodiment of the beater release of this invention incorporated therein;

Fig. 2 is a vertical section taken on line 2—2 of Fig. 1;

Fig. 3 is a top view of the gear housing portion of the power unit with the casing removed and showing the beater release mechanism;

Fig. 4 is a vertical section similar to Fig. 2, showing a modified embodiment of the beater release;

Fig. 5 is a top view of the gear housing and beater release mechanism of the modified embodiment, the casing being shown in section;

Fig. 6 is a view similar to Fig 2 of another modified embodiment adapted for use on a mixer having a power take-off socket in the top thereof; and Fig. 7 is a view similar to Fig. 3 of the modification of Fig. 6.

A fundamental concept of the release mechanism of this invention is to provide a resilient element which engages a groove on each beater shaft to hold the shaft in its spindle, the grooves being so located as to be exposed when the beater shafts are inserted in drive engagement in the spindles and clutch means being provided between the shafts and spindles to effect the drive engagement when the shafts are fully inserted. In order to effect rapid release of the beaters when desired, means are provided for applying a bending moment to the resilient element to move the portions engaging the grooves out of contact therewith.

Three embodiments of this invention have been illustrated as incorporated in substantially identical mixer power units, and, where identical, like parts have been identified by like numerals throughout the drawings.

The power unit 10, as shown in Figs. 1 to 3, comprises a conventional element motor (not shown) which is housed within a casing 11. At the front end of the motor a gear housing 12 is provided in which two beater spindles 13 and 14 are journalled. Each spindle carries a worm wheel 15 which meshes with a worm 16 formed on the end of the armature of the motor. One of the spindles 13 has a second worm 17 machined thereon which meshes with another worm wheel 18 carried by a power take-off shaft 20 which terminates in a socket provided in the end of a boss 21 formed on the end of the gear housing 12.

The upper portion of the housing 12 is in the form of a cover plate 22 having bearings 23 pressed therein journalling the upper ends of the spindles 13 and 14. The lower ends of the spindles are journalled in similar bearings 24 supported in the lower portion of the housing 12. To accommodate the end thrust developed by the spindle 13, a ball bearing 25 is provided between a shoulder 26 on the spindle and the bottom of the cover plate 22.

The lower ends of the spindles 13 and 14 are cross-kerfed as indicated at 27 to provide keyways which accommodate ears or lugs 28 formed on the beater shafts 30. It is preferred to provide four kerfs in each spindle and two diametrically spaced ears on each shaft so that the shafts may be inserted in various rotative positions spaced 90 degrees apart with respect to the spindles. Since the two spindles are both geared to the same worm 16, it is insured that the four blades on each of the beaters will interdigitate in proper spaced relation as the spindles are rotated regardless of in which kerf the ears are inserted. The ears 28 are preferably formed by upsetting the side portions of the shaft to cause them to project slightly outwardly, and the length of engagement of the kerfs 27 and the ears 28 is relatively small so that little downward movement of the beater shafts 30 is required to disengage the beaters from the driving spindles. Ample clearance is provided in the axial bores 31 so that the shafts will fall out of the spindles readily when released.

At the upper end of each of the beater shafts 30 an annular groove 32 is provided for engagement by a resilient beater retainer element 33 mounted on the top of the cover plate 22. The engagement of this element in the grooves 32 serves to retain the beaters in the spindles 13 and 14. When the element 33 is bent so as not to engage the grooves 32 the shafts 30 are free to move downwardly in the spindles terminating the drive engagement. The element 33 and the grooves 32 may be located at the bottom of the gear housing 22 if desired, but, if this arrangement is used it is preferred to employ a projecting shoulder instead of a groove so that the resilient element will not interfere with the falling of the beaters after release. A further advantage of the arrangement illustrated is that the release mechanism is on the top of the unit 10 where it cannot become contaminated by the mix.

The description thus far has dealt only with features of construction which are identical in all of the illustrated embodiments. Considering now the preferred embodiment, disclosed in Figs. 1 to 3, it will be apparent that the resilient element 33 is in the form of a straight wire of spring steel, one of whose ends is bent to form a loop 34 which is secured to a screw 35 received in the top of a boss on the cover plate 22. The opposite end of the element 33 is preferably freely movable, the screw 35 serving as a pivot or a retainer to prevent accidental dislodgment of the element 33 from the position shown. The middle portion of the element 33 extends through a slot 36 provided in the lower end of a shaft member 37 which is rotatably journalled in an opening 38 provided in the top of the cover plate 22. A shoulder 40 is provided near the top of the member 37 and engages the inside of the casing 11 to hold the lower end of the member 37 in the opening 38. The upper end of the shaft member 37 which projects through an opening 41 in the casing 11 carries an actuator lever 42. The end of the lever 42 is conveniently located beneath the power unit handle 43 in such a position as to be readily accessible to the operator's finger or thumb so that the lever 42 may be readily rotated in order to actuate the beater release and unclutch the beater shafts 30 from drive engagement. The skirt portions 43a of the handle 43 serve effectively as limit stops to prevent excessive rotation of the lever 42 which might damage the element 33, but it will be readily apparent that others or additional stops may be provided.

The slot 36 is of such length as to retain the element 33 in the vertical position shown and prevent upward movement thereof when the beater shafts are inserted in the spindles 13 and 14; otherwise the limitation of engagement at the ears 28 in the spindle ends prevent any thrust which might distort the spring element 33. The location of the screw 35 and the member 37 is such that the resilient element 33 normally lies in the position shown in solid lines in Fig. 3 with the sides of the element 33 overlapping the bores 31 provided in the spindles 13 and 14. Thus the element 33 normally engages the annular grooves 32 and locks the beater shafts 30 in the spindles. To provide for insertion of the beater shafts 30, the tops thereof are tapered as indicated at 44 so that when the shafts are pushed upwardly the tapered portions engage the element 33 forcing it laterally away from the bores 31 and permitting the shafts to be fully inserted. As soon as the grooves 32 are level with the element 33 it springs inwardly to lock the shafts 30 in place. As the shafts rotate when the mixer is operating the grooves rub the sides of the element 33, but the areas of contact are quite small so that negligible resistance is offered to the rotation of the shafts.

To release the beaters the operator merely rotates the lever 42 in the direction indicated by the arrow 49 in Fig. 2. This causes the element 33 to bend to the position shown in broken lines in Fig. 3 releasing the beater shafts 30 so that they may drop out of the spindles 13 and 14, the drive engagement of the ears 28 in the kerfs 27 being broken during the initial downward movement. Thus the beaters are unclutched from drive relationship as soon as the release is actuated even though they do not fall all of the way out of the spindles 13 and 14, and the release mechanism serves as a safety device permitting the operator to stop the motion of the beaters with a simple finger motion even when the power unit 10 is mounted over the mixing bowl.

The embodiment shown in Figs. 4 and 5 is substantially the same as the above described embodiment with the exception that lever 42 and shaft member 37 are eliminated and that the element 33a is somewhat longer in this embodiment projecting through a slot 50 in the side of the casing 11a. The end of the element 33a carries a knob 51 which is manually moved to effect disengagement of the beater shafts 30. A screw 52 is provided in the cover plate 22a between the spindles and serves as a fulcrum about which the element 33a is bent when the knob 51 is moved to the position shown in broken lines to release the beaters. The fulcrum screw 52 is located quite close to the spindle 13. This spacing has been found to provide the same rate of movement at both of the spindles when the knob 51 is moved to eject the beaters. This condition is desirable for it insures that the insertion of one beater will not inadvertently effect the release of the other beater by causing the member to spring to such a position that the other beater is disengaged. The optimum locations of the two screws 35a and 52 may be readily calculated utilizing the formulas for beam deflection which may be found in most strength of materials textbooks, or they may be determined quite easily by trial and error procedure.

The operation of this embodiment is substantially the same as the preferred embodiment with the exception that the knob is pulled rearwardly to apply the bending moment to the element 33a instead of rotating a lever to apply the moment.

The embodiment shown in Figs. 6 and 7 is almost identical with the preferred embodiment with the exception that the top of the casing 11b is apertured to provide an additional power take-off socket 60 through which the shaft 61 of a juicer or other attachment may be inserted. The upper socket 60 provides a convenient drive for high speed attachments while the socket on the front of the unit provides a low speed drive. The low speed socket may, of course, be eliminated if desired.

The top of the spindle 14b is provided with a pair of kerfs 62 for engaging ears 63 provided on the shaft 61 in the same manner as the beater shaft ears 28 engage the kerfs 27 at the lower end of the spindle.

Since the tool shaft 61 projects into the corresponding spindle 14b it is impossible to insert a beater in this spindle when the tool is being used. The novel construction of the beater release also makes it impossible to insert a beater in drive relation in the other spindle 13, because the shaft 61 causes the resilient element 33b to bend to the position shown in Fig. 7 when it is inserted, the opposite end of the element 33b being free and clear of the bore 31 in the spindle 13. Thus it is impossible to lock a beater shaft 30 in the spindle 13 when the tool shaft 61 is inserted in the spindle 14b. On the other hand, when the beater shaft is inserted in the spindle 14b, the element 33b lies along a straight line and secures both beaters in place, the same as in the preferred embodiment. If it is desired to modify the embodiment of Figs. 4 and 5 to have a high speed power take-off socket, an opening is merely provided in the casing above the spindle 14 and the spindle is cross-kerfed like the spindle 14b.

From the foregoing description it will be apparent that an extremely simple and efficient beater release mechanism has been provided which is inexpensive and easy to fabricate, is foolproof in operation, and fully fulfills the objects of this invention.

Various changes and modifications in addition to those set forth herein such as will present themselves to those familiar with the art may be made in the embodiments described without departing from the spirit of the invention whose scope is commensurate with the following claims.

What is claimed is:

1. In a mixer having a plurality of rotary spindles, each of said spindles having an axial bore therethrough for receiving a beater shaft, a beater shaft receivable in each of said axial bores, the shafts being of such length as to project slightly beyond the ends of the bores when fully inserted therein, a resilient element mounted for free flexure adjacent to the upper ends of said spindles, and means for applying a bending moment to said element to move same away from a normal resting position overlapping each of said bores to a release position away from said bores, said beater shafts having annular grooves therein adjacent to their upper ends the grooves being so located as to be engaged by the element in the resting position to retain said beater shafts in their spindles.

2. In a mixer having a plurality of rotary spindles, each of said spindles having an axial bore therethrough for receiving a beater shaft, a beater shaft for each of said spindles receivable in the axial bore, the shafts being of such length as to project slightly beyond the ends of the bores when fully inserted therein, a normally straight resilient element pivotally mounted slightly above and to one side of the upper ends of said spindles, and means for applying a bending moment to said element at a point remote from the pivot point to curve same away from a position overlapping each of said bores to a release position away from said bores, said beater shafts having annular grooves therein adjacent to their upper ends the grooves being so located as to be engaged by the element in the resting position to retain said beater shafts in their spindles.

3. In a food mixer of the class described, the combination of a spindle journalled for rotation, said spindle having an axial bore therein, a beater shaft receivable in said spindle in driven relationship and an opening through the top of the spindle exposing the end of the beater shaft, the upper end of said beater shaft being tapered and having a groove spaced slightly below the tapered portion, an elongated resilient element pivotally supported above the upper end of said spindle at a point to one side of said spindle and adapted to engage the groove in said beater shaft to hold same in said spindle, and means for exerting a bending force on said element to move same away from the spindle to release the beater shaft.

4. In a food mixer of the class described, the combination of a spindle journalled for rotation, said spindle having an axial bore therein, a beater shaft receivable in said spindle in driven relationship and an opening through the top of the spindle exposing the end of the beater shaft, the upper end of said beater shaft being tapered and having a groove spaced slightly below the tapered portion, an elongated resilient element supported proximate to the upper end of said spindle and adapted to engage the groove in said beater shaft to hold same in said spindle, and means for applying a bending moment to said resilient element to move same away from said groove to release the beater shaft.

5. In a food mixer of the class described, the combination of a pair of spindles journalled for rotation, a pair of beater shafts, each spindle having an axial bore therein for receiving a beater shaft in driven relationship and an opening through the top of each spindle permitting the end of the beater shaft received therein to project above the spindle, the upper end of each beater shaft being tapered and having a groove spaced slightly below the tapered portion, an elongated resilient element supported proximate to the upper ends of the spindles and adapted to engage the grooves in the beater shafts to hold same in the spindles, and means for applying a bending moment to said resilient element to move same simultaneously away from said grooves to release the beater shafts.

6. In a food mixer of the class described, the combination of a pair of beater shafts, a pair of spindles each having an axial bore therein for receiving a beater shaft, the upper end of each beater shaft being tapered and having a groove spaced below the tapered portion, an elongated resilient element supported proximate to the ends of the spindles and to engage the grooves in the beater shafts to hold same in the spindles, and means for applying a bending moment to said element to move same simultaneously away from said grooves to release the beater shafts.

7. In a food mixer of the class described, the combination of a pair of beater shafts, a pair of spindles journalled for rotation, each spindle having an axial bore therein for receiving a beater shaft in driven relationship and an opening through the top of each spindle permitting the end of the beater shaft received therein to project above the spindle, the upper end of each beater shaft being tapered and having a groove spaced slightly below the tapered portion, an elongated resilient element supported proximate to the upper ends of the spindles and to engage the grooves in the beater shafts to hold same in the spindles, and means for applying a bending moment to said element to move same simultaneously away from said grooves to release the beater shafts.

8. In a food mixer of the class described, the combination of a pair of spindles journalled for rotation, a pair of beater shafts, each spindle having an axial bore therein for receiving a beater shaft in driven relationship and an opening through the top of each spindle permitting the end of the beater shaft received therein to project above the spindle, the upper end of each beater shaft being tapered and having a groove spaced slightly below the tapered portion, an elongated resilient element supported proximate to the upper ends of the spindles and adapted to engage the grooves in the beater shafts to hold same in the spindles, said resilient element being also adapted to be subjected to a bending moment to move same simultaneously away from said grooves to release the beater shafts, and a manually rotable shaft for twisting said element at a point between the two spindles to apply said bending moment.

9. In a food mixer of the class described, the combination of a pair of spindles journalled for rotation, a pair of beater shafts, each spindle having an axial bore therein for receiving a beater shaft in driven relationship and an opening through the top of each spindle permitting the end of the beater shaft received therein to project above the spindle, the upper end of each beater shaft being tapered and having a groove spaced slightly below the tapered portion, an elongated resilient element supported proximate to the upper ends of the spindles and adapted to engage the grooves in the beater shafts to hold same in the spindles, and means including a manually accessible extension on said element for applying a bending moment to said resilient element to move same simultaneously away from said grooves to release the beater shafts.

10. In a food mixer of the class described, the combination of a beater shaft, a pair of spindles each having an axial bore therein capable of receiving the beater shaft, said beater shaft having a groove located thereon so as to lie beyond the end of the spindle when the shaft is received in one of the bores, and an elongated resilient element supported proximate to the ends of the spindles to engage the groove to hold the shaft in the spindle, and means for applying a bending moment to said resilient element to move same away from said groove to release the beater shaft for downward movement in the spindle.

FRED C. SCHWANEKE.

REFERENCES CITED

The following references are of record in the file of this patent:

UNITED STATES PATENTS

| Number | Name | Date |
| --- | --- | --- |
| 1,487,295 | Trowbridge | Mar. 18, 1924 |
| 2,329,640 | Moeller | Sept. 14, 1943 |
| 2,515,755 | Krause | July 18, 1950 |